N. J. SWEENEY.
FLOOD-GATE.

No. 192,470.

Patented June 26, 1877.

WITNESSES:
C. Neveux
J. H. Scarborough

INVENTOR:
N. J. Sweeney
BY
ATTORNEYS.

UNITED STATES PATENT OFFICE.

NEWTON J. SWEENEY, OF WALESBOROUGH, INDIANA.

IMPROVEMENT IN FLOOD-GATES.

Specification forming part of Letters Patent No. 192,470, dated June 26, 1877; application filed May 28, 1877.

*To all whom it may concern:*

Figure 1:
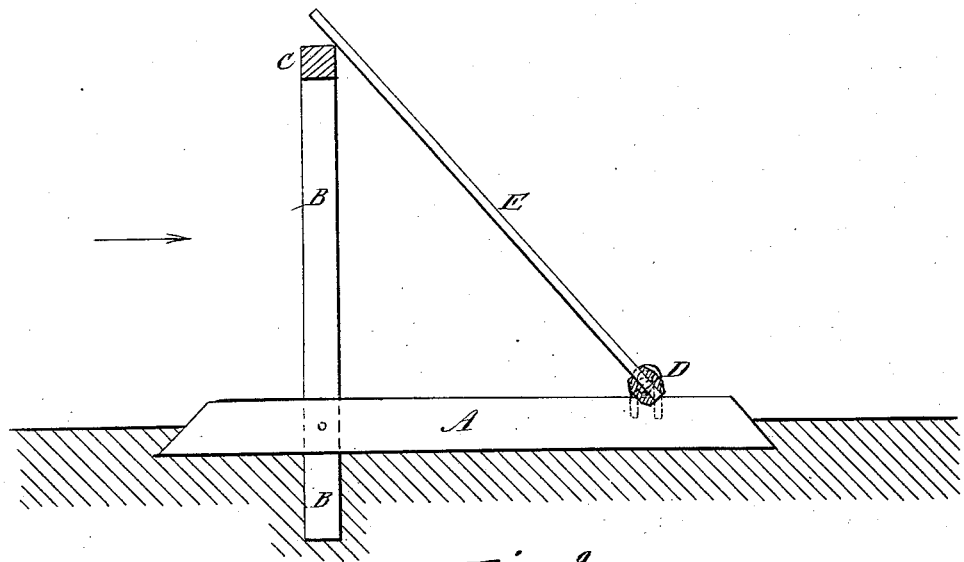
Figure 2:
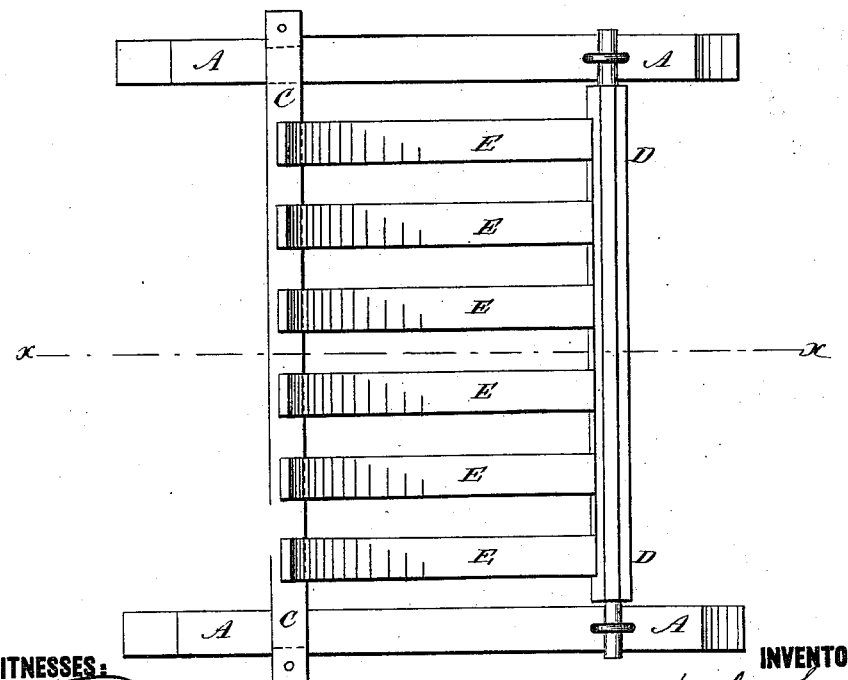

Be it known that I, NEWTON J. SWEENEY, of Walesborough, Bartholomew county, Indiana, have invented a new and Improved Flood-Gate, of which the following is a specification:

Figure 1 is a vertical section of my improved flood-gate, taken through line $x$ $x$ in Fig. 2, and Fig. 2 is a top view of the same.

The object of this invention is to furnish an improved flood-gate, which shall be so constructed as to roll down-stream when the water rises, so that the drift may pass through freely without injuring the gate, and without any chance to get fast in the gate and obstruct the flow of the water and the passage of other drift.

The invention consists in an improved floodgate formed by the combination of the sills, the posts, the cross-beam, the pivoted shaft, and the slats with each other, as hereinafter fully described.

A are two sills, which are bedded in the ground lengthwise of the stream.

B are two posts, which are securely set in the ground at the side of the sills A, and near their up-stream ends.

To the upper ends of the posts B is attached a cross bar or beam, C.

To the sills A at or near their down-stream ends are attached bearings, in which work the ends of the shaft D, to which are securely attached the ends of a series of parallel slats, E, the upper ends of which rest upon the cross-beam C.

The slats E should be of such a length and the shaft D should be pivoted at such a distance from the posts B that the said slats, when resting against the cross-beam C, may stand at an angle of about 45°.

The gate should be so set that the shaft D may be at or near low-water mark.

If desired, posts may be set deep in the ground at the side of the down-stream parts of the sills A, to prevent them from being underwashed and moved out of place by the current.

With this construction, as the water rises the gate D E will be rolled down-stream by the force of the water or by the drift floating upon it, so that the drift carried down by the water may pass through freely, the gate D E being so constructed that the drift cannot catch and lodge upon it.

Having thus described my invention, I claim as new and desire to secure by Letters Patent—

An improved flood-gate, formed by the combination of the sills A, the posts B, the cross-beam C, the pivoted shaft D, and the slats E with each other, substantially as herein shown and described.

NEWTON JASPER SWEENEY.

Witnesses:
 CHARLES B. STONE,
 JAMES M. COLE.